US012607777B2

(12) United States Patent
Suzuki et al.

(10) Patent No.: US 12,607,777 B2
(45) Date of Patent: Apr. 21, 2026

(54) TRANSPARENT SUBSTRATE WITH ANTI-REFLECTIVE FILM

(71) Applicant: AGC Inc., Tokyo (JP)

(72) Inventors: Katsumi Suzuki, Tokyo (JP); Kazuya Takemoto, Tokyo (JP); Tamotsu Morimoto, Tokyo (JP)

(73) Assignee: AGC Inc., Tokyo (JP)

( * ) Notice: Subject to any disclaimer, the term of this patent is extended or adjusted under 35 U.S.C. 154(b) by 610 days.

(21) Appl. No.: 18/147,414

(22) Filed: Dec. 28, 2022

(65) Prior Publication Data

US 2023/0144879 A1 May 11, 2023

Related U.S. Application Data

(63) Continuation of application No. PCT/JP2021/024605, filed on Jun. 29, 2021.

(30) Foreign Application Priority Data

Jul. 3, 2020 (JP) ................................. 2020-115919

(51) Int. Cl.
| | | |
|---|---|---|
| *C03C 17/34* | (2006.01) | |
| *G02B 1/115* | (2015.01) | |
| *G02B 1/18* | (2015.01) | |

(52) U.S. Cl.
CPC .......... *G02B 1/115* (2013.01); *C03C 17/3417* (2013.01); *C03C 2217/73* (2013.01); *C03C 2217/734* (2013.01); *C03C 2218/154* (2013.01); *G02B 1/18* (2015.01)

(58) Field of Classification Search
CPC ....... G02B 1/115; G02B 1/18; C03C 17/3417; C03C 2217/73; C03C 2218/154

USPC .......................................................... 428/1.3
See application file for complete search history.

(56) References Cited

U.S. PATENT DOCUMENTS

| | | |
|---|---|---|
| 2008/0199671 A1 | 8/2008 | Miyagi et al. |
| 2014/0106141 A1 | 4/2014 | Bellman et al. |
| 2014/0106146 A1 | 4/2014 | Decker et al. |
| 2014/0106150 A1 | 4/2014 | Decker et al. |
| 2014/0220327 A1 | 8/2014 | Adib et al. |
| 2015/0306847 A1 | 10/2015 | Bellman et al. |
| 2015/0329415 A1 | 11/2015 | Bellman et al. |
| 2017/0182744 A1 | 6/2017 | Bellman et al. |
| 2017/0320771 A1 | 11/2017 | Adib et al. |

(Continued)

FOREIGN PATENT DOCUMENTS

| | | | |
|---|---|---|---|
| CN | 105122090 A | 12/2015 | |
| CN | 111183373 A * | 5/2020 | ............... G02B 5/30 |

(Continued)

OTHER PUBLICATIONS

International Search Report issued Sep. 7, 2021 in PCT/JP2021/024605 filed Jun. 29, 2021, 2 pages.

*Primary Examiner* — Ruiyun Zhang
(74) *Attorney, Agent, or Firm* — Oblon, McClelland, Maier & Neustadt, L.L.P.

(57) ABSTRACT

An anti-reflective film-attached transparent substrate includes a transparent substrate having two main surfaces and, on at least one of the main surfaces, a multilayer film in which at least two layers having different refractive indices are laminated. At least one silicon oxide layer among the layers in the multilayer film has a moisture permeability of 300 g/m²/day or less.

25 Claims, 1 Drawing Sheet

(56)            References Cited

U.S. PATENT DOCUMENTS

| 2018/0203354 | A1 | 7/2018 | Fujii |
|---|---|---|---|
| 2020/0018872 | A1 | 1/2020 | Fujii et al. |
| 2020/0039873 | A1 | 2/2020 | Decker et al. |
| 2020/0123049 | A1 | 4/2020 | Fujii |
| 2020/0139677 | A1 | 5/2020 | Adib et al. |
| 2020/0409213 | A1 | 12/2020 | Takeda et al. |
| 2021/0009470 | A1 | 1/2021 | Decker et al. |
| 2021/0048570 | A1 | 2/2021 | Takeda et al. |
| 2021/0221733 | A1 | 7/2021 | Decker et al. |
| 2021/0230055 | A1 | 7/2021 | Decker et al. |
| 2023/0040422 | A1 | 2/2023 | Decker et al. |

FOREIGN PATENT DOCUMENTS

| JP | 2008-201633 | A | 9/2008 |
|---|---|---|---|
| JP | 2010-243163 | A | 10/2010 |
| JP | 2011-25510 | A | 2/2011 |
| JP | 2012-73542 | A | 4/2012 |
| JP | 2015-532258 | A | 11/2015 |
| JP | 2016-068470 | A | 5/2016 |
| JP | 2018-115105 | A | 7/2018 |
| JP | 2019-66515 | A | 4/2019 |
| JP | 2019-152863 | A | 9/2019 |
| JP | 2020-6651 | A | 1/2020 |
| WO | WO 2019/064969 | A1 | 4/2019 |

* cited by examiner

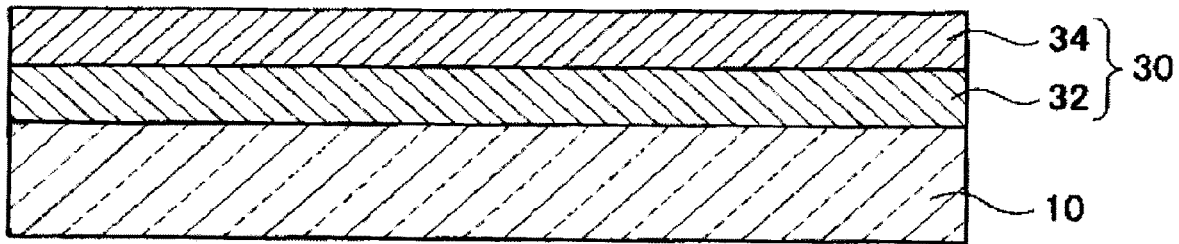

TRANSPARENT SUBSTRATE WITH ANTI-REFLECTIVE FILM

CROSS-REFERENCE TO RELATED APPLICATIONS

This is a bypass continuation of International Patent Application No. PCT/JP2021/024605, filed on Jun. 29, 2021, which claims priority to Japanese Patent Application No. 2020-115919, filed on Jul. 3, 2020. The contents of these applications are hereby incorporated by reference in their entireties.

TECHNICAL FIELD

The present invention relates to an anti-reflective film-attached transparent substrate.

BACKGROUND ART

In recent years, from the viewpoint of an aesthetic appearance, a method of installing a cover glass on a front surface of an image display device such as a liquid crystal display has been used.

In the above technique, reflection due to the cover glass reflecting external light is a problem. A multilayer film having a laminated structure is often provided on the surface of the cover glass in order to solve such a problem. However, in an anti-reflective film in the related art, a boundary line between a black frame portion and an image display portion in the image display device is conspicuous, and the aesthetic appearance is poor.

Therefore, there has been known that light absorptivity is imparted to the anti-reflective film, which is a multilayer film in which at least two dielectric layers having different refractive indices are laminated. Accordingly, the boundary line between the black frame portion and the image display portion in the image display device can be made inconspicuous. Further, reflection from an interface between the cover glass and the anti-reflective film can also be prevented.

For example, Patent Literature 1 discloses an anti-reflective film-attached transparent substrate, which has light absorptivity and an insulating property.

Patent Literature 2 discloses a transparent conductive laminate in which a silicon oxide layer and a copper layer are laminated in order.

Patent Literature 3 discloses an anti-reflective film having a coating made of a high refractive index material and a coating made of a low refractive index material on a surface of a glass plate, and the coating made of a low refractive index material is disposed on the outermost surface.

CITATION LIST

Patent Literature

Patent Literature 1: JP2018-115105A
Patent Literature 2: JP2016-068470A
Patent Literature 3: JP2008-201633A

SUMMARY OF INVENTION

Technical Problem

As described above, there has been known a technique of imparting light absorptivity to the multilayer film to provide an aesthetic appearance and further preventing reflection from the interface between the cover glass and the anti-reflective film.

However, it has not yet been possible to implement an anti-reflective film that has light absorptivity and satisfies prevention of a change in transmittance of the anti-reflective film due to moisture infiltration from the outside.

Therefore, an object of the present invention is to provide an anti-reflective film-attached transparent substrate which has light absorptivity and satisfies prevention of a change in transmittance of an anti-reflective film due to moisture infiltration from the outside.

Solution to Problem

The present inventors have found that the above object can be achieved by using an anti-reflective film-attached transparent substrate which includes a transparent substrate having two main surfaces and, on at least one of the main surfaces, a multilayer film in which at least two layers having different refractive indices are laminated, and in which at least one silicon oxide layer among the layers in the multilayer film has a moisture permeability of 300 $g/m^2/day$ or less. Thus, the present invention has been completed.

It is preferable that, in the anti-reflective film-attached transparent substrate according to an aspect of the present invention, the multilayer film has a structure in which at least two layers having different refractive indices are laminated, and at least one layer among the layers in the multilayer film is mainly formed of an Si oxide, at least another layer among the layers in the multilayer film is mainly formed of a mixed oxide of an oxide containing at least one element elected from the group A consisting of Mo and W and an oxide containing at least one element selected from the group B consisting of Si, Nb, Ti, Zr, Ta, Al, Sn, and In, and a content of the elements of the group B contained in the mixed oxide is less than 80 mass % with respect to a total of the elements of the group A contained in the mixed oxide and the elements of the group B contained in the mixed oxide.

It is preferable that, in the anti-reflective film-attached transparent substrate according to the aspect of the present invention, the at least one silicon oxide layer among the layers in the multilayer film has an arithmetic mean height (Sa) of 1.00 nm or less, which represents a surface roughness in a measurement range of 1 μm×1 μm.

It is preferable that, in the anti-reflective film-attached transparent substrate according to the aspect of the present invention, the at least one silicon oxide layer among the layers in the multilayer film has an arithmetic mean height (Sa) of 0.90 nm or less, which represents a surface roughness in a measurement range of 5 μm×5 μm.

It is preferable that, in the anti-reflective film-attached transparent substrate according to the aspect of the present invention, the at least one silicon oxide layer among the layers in the multilayer film has a hardness of 5.0 GPa or more.

It is preferable that, in the anti-reflective film-attached transparent substrate according to the aspect of the present invention, the at least one silicon oxide layer among the layers in the multilayer film has an elastic modulus of 70 GPa or more.

It is preferable that the anti-reflective film-attached transparent substrate according to the aspect of the present invention further includes an anti-fouling film on the anti-reflective film.

It is preferable that, in the anti-reflective film-attached transparent substrate according to the aspect of the present invention, the transparent substrate is a glass substrate.

It is preferable that, in the anti-reflective film-attached transparent substrate according to the aspect of the present invention, the transparent substrate is a resin substrate.

It is preferable that, in the anti-reflective film-attached transparent substrate according to the aspect of the present invention, the transparent substrate is a laminate formed of a glass and a resin substrate.

It is preferable that, in the anti-reflective film-attached transparent substrate according to the aspect of the present invention, the glass is chemically strengthened.

It is preferable that, in the anti-reflective film-attached transparent substrate according to the aspect of the present invention, the transparent substrate is subjected to an anti-glare treatment on the main surface on a side where the anti-reflective film is provided.

It is preferable that, in the anti-reflective film-attached transparent substrate according to the aspect of the present invention, an image display device includes the anti-reflective film-attached transparent substrate.

Advantageous Effects of Invention

According to one aspect of the present invention, it is possible to provide an anti-reflective film-attached transparent substrate which has light absorptivity and satisfies prevention of a change in transmittance of an anti-reflective film due to moisture infiltration from the outside.

BRIEF DESCRIPTION OF DRAWINGS

The FIGURE is a cross-sectional view schematically showing a configuration example of an anti-reflective film-attached transparent substrate.

DESCRIPTION OF EMBODIMENTS

Hereinafter, embodiments of the present invention will be described in detail with reference to the drawings.

An anti-reflective film-attached transparent substrate according to an embodiment of the present invention includes a transparent substrate having two main surfaces, and, on at least one of the main surfaces, a multilayer film in which at least two layers having different refractive indices are laminated, in which at least one silicon oxide layer among the layers in the multilayer film has a moisture permeability of 300 $g/m^2$/day or less.

The transparent substrate according to the present embodiment is not particularly limited as long as it is a transparent substrate having excellent translucency. Examples thereof include a glass and a resin.

In the anti-reflective film-attached transparent substrate (multilayer film-attached transparent substrate) according to the present embodiment, the multilayer film preferably has the following configuration.

The FIGURE is a cross-sectional view schematically showing a configuration example of the multilayer film-attached transparent substrate. A multilayer film 30 is formed on a transparent substrate 10. The multilayer film 30 shown in the FIGURE has a laminated structure in which two dielectric layers 32 and 34 having different refractive indices are laminated. By laminating the dielectric layers 32 and 34 having different refractive indices, reflection of light is prevented. The dielectric layer 32 is a high refractive index layer, and the dielectric layer 34 is a low refractive index layer.

In the multilayer film 30 shown in the FIGURE, the dielectric layer 32 is preferably formed of a mixed oxide of at least one element selected from the group A consisting of Mo and W and at least one element selected from the group B consisting of Si, Nb, Ti, Zr, Ta, Al, Sn, and In. In the mixed oxide, the content of the elements of the group B contained in the mixed oxide (hereinafter, described as a group B content) is less than 80 mass % or less with respect to a total of the elements of the group A contained in the mixed oxide and the elements of the group B contained in the mixed oxide.

The dielectric layer 34 is preferably formed of $SiO_x$.

The dielectric layer 32 is preferably formed of a mixed oxide of an oxide containing at least one element selected from the group A consisting of Mo and W and an oxide containing at least one element selected from the group B consisting of Si, Nb, Ti, Zr, Ta, Al, Sn, and In. Among these, Mo is preferred for the group A, and Nb is preferred for the group B.

The use of the dielectric layer 34, which is an oxygen-deficient silicon oxide layer, and the dielectric layer 32 containing Mo and Nb is preferred since the silicon oxide layer is not yellowish by using Mo and Nb even when oxygen is deficient, while the oxygen-deficient silicon oxide layer is generally yellowish in visible light.

A refractive index of the dielectric layer 32 at a wavelength of 550 nm is preferably 1.8 to 2.3 from the viewpoint of the transmittance with respect to the transparent substrate. An extinction coefficient of the dielectric layer 32 is preferably 0.005 to 3, more preferably 0.01 to 1, and still more preferably 0.04 to 0.38.

When the extinction coefficient is 0.005 or more, a desired absorption rate can be realized with an appropriate number of layers. Further, when the extinction coefficient is 3 or less, it is relatively easy to achieve both the reflection color hue and the transmittance.

The multilayer film 30 shown in the FIGURE has a laminated structure in which two dielectric layers 32 and 34 are laminated, but the multilayer film in the present embodiment is not limited thereto, and may have a laminated structure in which three or more layers having different refractive indices are laminated. In this case, it is not necessary that all the layers have different refractive indices.

For example, in the case of a three-layer laminated structure, a three-layer laminated structure including a low refractive index layer, a high refractive index layer, and a low refractive index layer, or a three-layer laminated structure including a high refractive index layer, a low refractive index layer, and a high refractive index layer can be used. In the former case, the two low refractive index layers may have the same refractive index. In the latter case, the two high refractive index layers may have the same refractive index.

In the case of a four-layer laminated structure, a four-layer laminated structure including a low refractive index layer, a high refractive index layer, a low refractive index layer, and a high refractive index layer, or a four-layer laminated structure including a high refractive index layer, a low refractive index layer, a high refractive index layer, and a low refractive index layer can be used. In this case, the two low refractive index layers and the two high refractive index layers may each have the same refractive index.

Here, the high refractive index layer is a layer having a refractive index of 1.8 or more at a wavelength of, for example, 550 nm, and the low refractive index layer is a layer having a refractive index of 1.6 or less at a wavelength of 550 nm.

There has been known a halftone mask used in the semiconductor production field as a light transmitting film having light absorptivity and an insulating property. As the halftone mask, an oxygen-deficient film such as a Mo—$SiO_x$ film containing a small amount of Mo is used. In addition, as the light transmitting film having light absorptivity and an insulating property, there is a narrow-bandgap film used in the semiconductor production field.

However, since these films have high light absorptivity on a short wavelength side of visible light, the transmitted light is yellowish. Therefore, these films are not suitable for a cover glass in an image display device.

In the present embodiment, when the dielectric layer 32 having an increased content of Mo and the dielectric layer 34 formed of $SiO_x$ are provided, it is possible to obtain an anti-reflective film-attached transparent substrate having light absorptivity and an insulating property and excellent adhesiveness and strength.

When the multilayer film 30 in the anti-reflective film-attached transparent substrate shown in the FIGURE has the above configuration, the characteristics of the anti-reflective film-attached transparent substrate according to the present embodiment described above are satisfied.

When the group B content is less than 80 mass % in the layer (A-B—O) 32 formed of the mixed oxide of an oxide containing at least one selected from the group A consisting of Mo and W and an oxide containing at least one selected from the group B consisting of Si, Nb, Ti, Zr, Ta, Al, Sn, and In, it is possible to prevent b* value from exceeding 5. The group B content is more preferably 70 mass % or less, and still more preferably 60 mass % or less.

In the case of a laminated structure in which three or more layers having different refractive indices are laminated, a layer other than the layer (A-B—O) and the layer ($SiO_x$) may be provided. In this case, it is necessary to select each layer so as to have a three-layer laminated structure including a low refractive index layer, a high refractive index layer, and a low refractive index layer, a three-layer laminated structure including a high refractive index layer, a low refractive index layer, and a high refractive index layer, a four-layer laminated structure including a low refractive index layer, a high refractive index layer, a low refractive index layer, and a high refractive index layer, or a four-layer laminated structure including a high refractive index layer, a low refractive index layer, a high refractive index layer, and a low refractive index layer, including the layer (A-B—O) and the layer ($SiO_x$).

The outermost layer is preferably the layer ($SiO_x$). This is because when the outermost layer is the layer ($SiO_x$), the outermost layer can be relatively easily produced in order to obtain low reflectivity. In the case of forming an anti-fouling film, it is preferable to form the anti-fouling film on the layer ($SiO_x$) from the viewpoint of a bonding property relating to durability of the anti-fouling film.

The layer (A-B—O) 32 is preferably amorphous. Being amorphous, the layer (A-B—O) 32 can be formed at a relatively low temperature, and, when the transparent substrate is made of a resin, can be suitably applied without the resin being damaged by heat.

In the multilayer film-attached transparent substrate according to the present embodiment, the at least one silicon oxide among the layers in the multilayer film has a moisture permeability of 300 g/m²/day or less. When the moisture permeability is within the above range, moisture infiltration from the outside can be prevented, so that a change in transmittance of the anti-reflective film due to the moisture infiltration can be prevented.

The moisture permeability can be measured by the method specified in JIS Z 0208 (1976), as described in Examples below. The moisture permeability of the multilayer film-attached transparent substrate according to the present embodiment is preferably 0.1 g/m²/day to 300 g/m²/day, and more preferably 0.1 g/m²/day to 100 g/m²/day.

In the multilayer film-attached transparent substrate according to the present embodiment, the at least one silicon oxide layer among the layers in the multilayer film has a surface roughness (arithmetic mean height (Sa)) of 1.00 nm or less in a measurement range of 1 μm×1 μm. When the surface roughness (arithmetic mean height (Sa)) is within the above range, the silicon oxide layer is dense, and moisture infiltration from the outside can be prevented, so that a change in transmittance of the anti-reflective film due to the moisture infiltration can be prevented.

The surface roughness (arithmetic mean height (Sa)) in a measurement range of 1 μm×1 μm can be measured with a scanning probe microscope, for example, in compliance with the international standard ISO 25178, as described in Examples below.

In the silicon oxide layer of the multilayer film-attached transparent substrate according to the present embodiment, the surface roughness (arithmetic mean height (Sa)) in a measurement range of 1 μm×1 μm is preferably 0.05 nm to 0.99 nm, and more preferably 0.05 nm to 0.98 nm.

In the multilayer film-attached transparent substrate according to the present embodiment, the at least one silicon oxide layer among the layers in the multilayer film has a surface roughness (arithmetic mean height (Sa)) of 0.90 nm or less in a measurement range of 5 μm×5 μm. When the surface roughness (arithmetic mean height (Sa)) is within the above range, the silicon oxide layer is dense, and moisture infiltration from the outside can be prevented, so that a change in transmittance of the anti-reflective film due to the moisture infiltration can be prevented.

The surface roughness (arithmetic mean height (Sa)) in a measurement range of 5 μm×5 μm can be measured with a scanning probe microscope, for example, in compliance with the international standard ISO 25178, as described in Examples below.

In the silicon oxide layer of the multilayer film-attached transparent substrate according to the present embodiment, the surface roughness (arithmetic mean height (Sa)) in a measurement range of 5 μm×5 μm is preferably 0.05 nm to 0.90 nm, and more preferably 0.05 nm to 0.87 nm.

In the multilayer film-attached transparent substrate according to the present embodiment, the at least one silicon oxide layer among the layers in the multilayer film has a hardness of 5.0 GPa or more when measured by applying a load of 0.1 mN. When the hardness is within the above range, the silicon oxide layer is dense, and moisture infiltration from the outside can be prevented, so that a change in transmittance of the anti-reflective film due to the moisture infiltration can be prevented.

The hardness of the silicon oxide layer can be measured, for example, with a surface force measuring device (nanoindenter), as described in Examples below.

In the multilayer film-attached transparent substrate according to the present embodiment, the hardness of the silicon oxide layer is preferably 5.0 GPa to 20.0 GPa, and more preferably 5.2 GPa to 15.0 GPa when measured by applying a load of 0.1 mN.

In the multilayer film-attached transparent substrate according to the present embodiment, the at least one silicon oxide layer among the layers in the multilayer film has a hardness of 6.6 GPa or more when measured by applying a load of 1 mN. When the hardness is within the above range, the silicon oxide layer is dense, and moisture infiltration from the outside can be prevented, so that a change in transmittance of the anti-reflective film due to the moisture infiltration can be prevented.

The hardness of the silicon oxide layer can be measured, for example, with a surface force measuring device (nanoindenter), as described in Examples below.

In the multilayer film-attached transparent substrate according to the present embodiment, the hardness of the silicon oxide layer is preferably 6.6 GPa to 20.0 GPa, and more preferably 6.7 GPa to 15.0 GPa when measured by applying a load of 1 mN.

In the multilayer film-attached transparent substrate according to the present embodiment, the at least one silicon oxide layer among the layers in the multilayer film has an elastic modulus of 70 GPa or more when measured by applying a load of 0.1 mN. When the elastic modulus is within the above range, the silicon oxide layer is dense, and moisture infiltration from the outside can be prevented, so that a change in transmittance of the anti-reflective film due to the moisture infiltration can be prevented.

The elastic modulus of the silicon oxide layer can be measured, for example, with a surface force measuring device (nanoindenter), as described in Examples below.

In the multilayer film-attached transparent substrate according to the present embodiment, the elastic modulus of the silicon oxide layer is preferably 70 GPa to 200 GPa, and more preferably 72 GPa to 150 GPa when measured by applying a load of 0.1 mN.

In the multilayer film-attached transparent substrate according to the present embodiment, the at least one silicon oxide layer among the layers in the multilayer film has an elastic modulus of 81 GPa or more when measured by applying a load of 1 mN. When the elastic modulus is within the above range, the silicon oxide layer is dense, and moisture infiltration from the outside can be prevented, so that a change in transmittance of the anti-reflective film due to the moisture infiltration can be prevented.

The elastic modulus of the silicon oxide layer can be measured, for example, with a surface force measuring device (nanoindenter), as described in Examples below. In the multilayer film-attached transparent substrate according to the present embodiment, the elastic modulus of the silicon oxide layer is preferably 81 GPa to 200 GPa, and more preferably 81 GPa to 150 GPa when measured by applying a load of 1 mN.

Hereinafter, the multilayer film-attached transparent substrate according to the present embodiment will be further described.

<Transparent Substrate>

The transparent substrate is preferably made of a material having a refractive index of 1.4 or more and 1.7 or less. This is because, when a display, a touch panel, or the like is optically bonded thereto, reflection on a bonding surface can be sufficiently prevented.

The transparent substrate is preferably a glass substrate or a resin substrate. The transparent substrate may be a laminate formed of a glass and a resin substrate.

As the glass substrate, glasses having various compositions can be used. For example, the glass used in the present embodiment preferably contains sodium, and preferably has a composition that can be molded and strengthened by a chemical strengthening treatment. Specific examples thereof include an aluminosilicate glass, a soda lime glass, a borosilicate glass, a lead glass, an alkali barium glass, and an aluminoborosilicate glass.

The thickness of the glass substrate is not particularly limited, and is usually preferably 5 mm or less, and more preferably 3 mm or less in order to effectively perform the chemical strengthening treatment.

The glass substrate is preferably a chemically strengthened glass in order to increase the strength of the cover glass. When an anti-glare treatment is applied to the glass substrate, the chemical strengthening is performed after the anti-glare treatment and before the multilayer film is formed.

It is preferable that the anti-glare treatment is applied to the main surface of the glass substrate on the side where the multilayer film is provided. The anti-glare treatment method is not particularly limited, and a method of applying a surface treatment to the main surface of the glass to form desired unevenness can be used.

Specific examples thereof include a method of performing a chemical treatment on a main surface of a glass substrate, for example, a method of performing a frosting treatment. In the frosting treatment, for example, a glass substrate to be treated is immersed in a mixed solution of hydrogen fluoride and ammonium fluoride, and the immersed surface can be chemically surface-treated.

In addition to these chemical treatments, physical treatments such as sandblasting, in which a crystalline silicon dioxide powder, a silicon carbide powder, or the like is blown onto the glass substrate surface with pressurized air, or polishing with a brush moistened with water and adhered with a crystalline silicon dioxide powder, a silicon carbide powder, or the like, can be used.

The resin substrate is preferably a resin film. A thermoplastic resin or a thermosetting resin can be used as the resin film. Examples thereof include a polyvinyl chloride resin, a polyethylene resin, a polypropylene resin, a polystyrene resin, a polyvinyl acetate resin, a polyester resin, a polyurethane resin, a cellulose-based resin, an acrylic resin, an acrylonitrile-styrene (AS) resin, an acrylonitrile-butadiene-styrene (ABS) resin, a fluorine-based resin, a thermoplastic elastomer, a polyamide resin, a polyimide resin, a polyacetal resin, a polycarbonate resin, a modified polyphenylene ether resin, a polyethylene terephthalate resin, a polybutylene terephthalate resin, a polylactic acid-based resin, a cyclic polyolefin resin, and a polyphenylene sulfide resin.

Among these, a cellulose-based resin is preferred, and a triacetylcellulose resin, a polycarbonate resin, and a polyethylene terephthalate resin are more preferred. These resins may be used alone or in combination of two or more kinds thereof.

The thickness of the film is not particularly limited, and is preferably 20 μm to 150 μm, and more preferably 40 μm to 80 μm.

When a film is used as the transparent substrate 10, as the present embodiment, a hard coat layer (not shown) or an anti-glare layer (not shown) may be disposed on the transparent substrate 10, and the multilayer film 30 may be provided thereon.

Further, as another embodiment, an anti-glare layer may be disposed on the hard coat layer, and the multilayer film 30 may be provided thereon.

As the hard coat layer, one obtained by dissolving a polymer resin can be applied.

The anti-glare layer increases haze by forming an uneven shape on one surface of the film, thereby imparting the anti-glare property. Similar to the hard coat layer, as the anti-glare layer, one obtained by dissolving a polymer resin can be applied. An anti-glare layer composition constituting the anti-glare layer is formed by dispersing at least a particulate substance having an anti-glare property in a solution in which a polymer resin as a binder is dissolved.

Examples of the particulate substance having an anti-glare property include inorganic fine particles such as silica, clay, talc, calcium carbonate, calcium sulfate, barium sulfate, aluminum silicate, titanium oxide, synthetic zeolite, alumina, and smectite, and organic fine particles formed of a styrene resin, a urethane resin, a benzoguanamine resin, a silicone resin, and an acrylic resin.

Examples of the polymer resin as a binder for the hard coat layer and the anti-glare layer include polymer resins such as a polyester-based resin, an acrylic resin, an acrylic urethane-based resin, a polyester acrylate-based resin, a polyurethane acrylate-based resin, an epoxy acrylate-based resin, and a urethane-based resin.

<Multilayer Film>

The multilayer film described above can be formed on the main surface of the transparent substrate by using known deposition methods such as a sputtering method, a vacuum deposition method, and a coating method. That is, the dielectric layers or layers constituting the multilayer film are formed on the main surface of the transparent substrate by known deposition methods such as a sputtering method, a vacuum deposition method, and a coating method according to the lamination order.

Examples of the sputtering method include magnetron sputtering, pulse sputtering, AC sputtering, and digital sputtering.

For example, a magnetron sputtering method is a method in which a magnet is installed on the back surface of a dielectric material serving as a base material to generate a magnetic field, and gas ion atoms collide with the surface of the dielectric material and are knocked out to form a sputtering film having a thickness of several nm. According to the magnetron sputtering method, a continuous film of dielectric, which is an oxide or nitride of the dielectric material, can be formed.

For example, a digital sputtering method is a method of forming a metal oxide thin film by repeating, in the same chamber, a step of forming an extremely thin metal film first by sputtering and then oxidizing the extremely thin metal film by irradiation with oxygen plasma, oxygen ions, or oxygen radicals, unlike the normal magnetron sputtering. In this case, since deposition molecules are metals when formed on the substrate, it is presumed that the film is more ductile than a case where the film is formed with a metal oxide. Therefore, it is considered that the rearrangement of the deposition molecules easily occurs even with the same energy, and as a result, a dense and smooth film can be formed.

The material of the anti-reflective film is not particularly limited, and various materials can be used as long as they can prevent the reflection of light. For example, the anti-reflective film may have a structure in which a high refractive index layer and a low refractive index layer are laminated. Here, the high refractive index layer is a layer having a refractive index of 1.8 or more at a wavelength of 550 nm, and the low refractive index layer is a layer having a refractive index of 1.6 or less at a wavelength of 550 nm.

In the anti-reflective film-attached transparent substrate according to the present embodiment, the anti-reflective film may be provided on at least one main surface of the transparent substrate, or may be provided on both main surfaces of the transparent substrate as required.

<Anti-Fouling Film>

The multilayer film-attached transparent substrate according to the present embodiment may further include an anti-fouling film (also referred to as an anti-finger print (AFP) film) on the multilayer film from the viewpoint of protecting the outermost surface of the film. The anti-fouling film is formed of, for example, a fluorine-containing organosilicon compound.

The fluorine-containing organosilicon compound is not particularly limited as long as it can impart an antifouling property, water repellency, and oil repellency. Examples of the fluorine-containing organosilicon compound include fluorine-containing organosilicon compounds having one or more groups selected from the group consisting of a polyfluoropolyether group, a polyfluoroalkylene group, and a polyfluoroalkyl group. The polyfluoropolyether group is a divalent group having a structure in which a polyfluoroalkylene group and an ether oxygen atom are alternately bonded.

As the commercially available fluorine-containing organosilicon compound having one or more groups selected from the group consisting of a polyfluoropolyether group, a polyfluoroalkylene group, and a polyfluoroalkyl group, KP-801 (trade name, manufactured by Shin-Etsu Chemical Co., Ltd.), KY178 (trade name, manufactured by Shin-Etsu Chemical Co., Ltd.), KY-130 (trade name, manufactured by Shin-Etsu Chemical Co., Ltd.), KY-185 (trade name, manufactured by Shin-Etsu Chemical Co., Ltd.), OPTOOL (registered trademark) DSX and OPTOOL AES (trade names, each manufactured by Daikin Industries, Ltd.), and the like can be preferably used.

The anti-fouling film is laminated on the anti-reflective film. When the anti-reflective film is formed on both main surfaces of the glass substrate or the resin substrate, the anti-fouling film may be formed on both of the anti-reflective films, or the anti-fouling film may be laminated on only one of the surfaces. This is because the anti-fouling film only needs to be provided at a place where the hand of a person may come into contact with the anti-fouling film. The anti-fouling film can be selected according to the use or the like.

The multilayer film-attached transparent substrate according to the present embodiment is suitable as a cover glass of an image display device, particularly a cover glass of an image display device to be mounted on a vehicle or the like, such as an image display device of a navigation system to be mounted on a vehicle or the like.

EXAMPLES

Hereinafter, the present invention is described in detail with reference to Examples, but the present invention is not limited thereto. Examples 1 and 2 are Working Examples, and Examples 3 and 4 are Comparative Examples.

Example 3

With the following method, an anti-reflective film was formed on one main surface of a transparent substrate to prepare an anti-reflective film-attached transparent substrate.

As the transparent substrate, a triacetyl cellulose resin film having a thickness of 40 μm (hereinafter referred to as a TAC film) was used.

Next, in the following method, for a dielectric layer (1) (metal oxide layer) on one main surface of the transparent substrate, by a digital sputtering method, a target obtained by mixing and sintering niobium and molybdenum at a weight ratio of 60:40 was used, and while maintaining the pressure at 0.2 Pa, an oxide film was formed by repeating the formation of a small-thickness metal film with argon gas and the subsequent oxidation with oxygen gas at a high speed, so as to form a Mo—Nb—O layer with 10 nm on the main surface of the transparent substrate to which a diffusion layer was bonded.

Next, for a dielectric layer (2) (silicon oxide layer), by a digital sputtering method, a silicon target was used, and while maintaining the pressure at 0.3 Pa, a silicon oxide film is formed by repeating the formation of a silicon film with argon gas and the subsequent oxidation with oxygen gas at a high speed, so as to form, on the Mo—Nb—O layer, a layer made of silicon oxide [silica ($SiO_x$)] having a thickness of 40 nm. Here, an oxygen flow rate during the oxidation with oxygen gas was 500 sccm, and an input power of the oxidation source was 200 W.

Next, for a dielectric layer (3) (metal oxide layer), by a digital sputtering method, a target obtained by mixing and sintering niobium and molybdenum at a weight ratio of 60:40 was used, and while maintaining the pressure at 0.2 Pa, an oxide film was formed by repeating the formation of a small-thickness metal film with argon gas and the subsequent oxidation with oxygen gas at a high speed, so as to form, on the silicon oxide layer, a Mo—Nb—O layer having a thickness of 120 nm.

Next, for a dielectric layer (4) (silicon oxide layer), by a digital sputtering method, a silicon target obtained was used, and while maintaining the pressure at 0.3 Pa, a silicon oxide film is formed by repeating the formation of a silicon film with argon gas and the subsequent oxidation with oxygen gas at a high speed, so as to form, on the Mo—Nb—O layer, a layer made of silicon oxide [silica ($SiO_x$)] having a thickness of 100 nm. Here, an oxygen flow rate during the oxidation with oxygen gas was 500 sccm, and an input power of the oxidation source was 200 W.

For the transparent substrate of the anti-reflective film-attached transparent substrate obtained in this way, the spectral transmittances before charging into a reliability test chamber at 95° C. and 500 hours after charging were measured by a spectrophotometer (trade name: Solid Spec-3700 manufactured by Shimadzu Corporation), and the luminous transmittances (stimulus value Y defined in JIS Z 8701:1999) were determined by calculation. The amount of change in luminous transmittance was obtained based on the luminous transmittance before charging and the luminous transmittance after 500 hours.

As a result, the amount of change in luminous transmittance in Example 3 was 5%.

Example 1

An anti-reflective film-attached transparent substrate was prepared in the same manner as Example 3 except that the pressure when forming the silicon oxide layers as the dielectric layer (2) and the dielectric layer (4) was changed to 0.1 Pa. The amount of change in luminous transmittance in Example 1 was 2%.

Example 2

An anti-reflective film-attached transparent substrate was prepared in the same manner as Example 1 except that, when forming the silicon oxide layers as the dielectric layer (2) and the dielectric layer (4), a linear ion source (manufactured by ULVAC, Inc.) was used to emit high-energy argon ions to the deposition surface at an input voltage of 2 kV. The amount of change in luminous transmittance in Example 2 was 1.5%.

Example 4

No anti-reflective film was formed on one main surface of the transparent substrate in Example 3.
(Measurement of Moisture Permeability of Silicon Oxide Layer)

The moisture permeability of the silicon oxide layer having a thickness of 100 nm formed on a triacetyl cellulose resin film having a length of 100 mm, a width of 100 nm, and a thickness of 40 μm under the deposition conditions in Examples 1, 2 and 3 was measured using a moisture permeable cup based on JIS Z 0208 (1976) "Test method for moisture permeability of moisture-proof packaging materials". In the measurement, a moisture-absorbing agent/calcium chloride (anhydrous) was enclosed in the moisture permeable cup, weighing operations were repeated at regular intervals (every 24 hours or 48 hours), and the mass increase of the cup was evaluated as the permeation amount of water vapor. The results of the following evaluation are shown in Table 1 below.

For the silicon oxide layer having a thickness of 100 nm formed on a chemically strengthened glass substrate (Dragontrail: Registered trademark, manufactured by AGC Inc.) having a length of 100 mm, a width of 100 mm, and a thickness of 1.1 mm under the deposition conditions in Examples 1, 2 and 3, the results of the following evaluation are shown in Table 1 below.
(Surface Roughness (Arithmetic Mean Height (Sa)) of Silicon Oxide Layer)

Measurement was performed by using a measuring device [device name: scanning probe microscope AFM5100N manufactured by Hitachi High-Tech Corporation], measurement range: 1 μm×1 μm (or 5 μm×5 μm), operation frequency: 1.2 Hz, tapping number: 256×256.
(Hardness of Silicon Oxide Layer)

Measurement was performed by applying a load of 0.1 mN (or 1 mN) using a measuring device [device name: surface force measuring device (nanoindenter) ESF-5000 Plus, manufactured by ELIONIX INC.].
(Elastic Modulus of Silicon Oxide Layer)

Measurement was performed by applying a load of 0.1 mN (or 1 mN) using a measuring device [device name: surface force measuring device (nanoindenter) ESF-5000 Plus, manufactured by ELIONIX INC.].

TABLE 1

|  |  | Example 1 | Example 2 | Example 3 | Example 4 |
|---|---|---|---|---|---|
| Structure | Substrate | TAC film | TAC film | TAC film | TAC film |
|  | Dielectric layer (1) | Mo—Nb—O (10 nm) | Mo—Nb—O (10 nm) | Mo—Nb—O (10 nm) | — |
|  | Dielectric layer (2) | $SiO_x$ (40 nm) | $SiO_x$ (40 nm) | $SiO_x$ (40 nm) | — |

TABLE 1-continued

|  |  | Example 1 | Example 2 | Example 3 | Example 4 |
|---|---|---|---|---|---|
|  | Dielectric layer (3) | Mo—Nb—O (120 nm) | Mo—Nb—O (120 nm) | Mo—Nb—O (120 nm) | — |
|  | Dielectric layer (4) | $SiO_x$ (100 nm) | $SiO_x$ (100 nm) | $SiO_x$ (100 nm) | — |
| Deposition method |  | Digital sputtering | Digital sputtering | Digital sputtering | — |
| Chang in optical characteristics | Amount of change in luminous transmittance (%) | 2 | 1.5 | 5 | — |
| Surface roughness (arithmetic mean height (Sa)) of silicon oxide layer | 1 μm × 1 μm (nm) | 0.96 | 0.42 | 1.28 | — |
|  | 5 μm × 5 μm (nm) | 0.85 | 0.40 | 0.97 | — |
| Hardness (GPa) of silicon oxide layer | 0.1 mN | 5.4 | 8.7 | 4.9 | — |
|  | 1 mN | 7.0 | 8.5 | 6.5 | — |
| Elastic modulus (GPa) of silicon oxide layer | 0.1 mN | 75 | 90 | 68 | — |
|  | 1 mN | 82 | 85 | 80 | — |
| Moisture permeability (g/m²/day) of silicon oxide layer | First day | 70 | 3 | 326 or more | 326 |
|  | Second day | 62 | 3 | 318 | 327 |

As shown in Table 1, the silicon oxide layers in Examples 1 and 2 have a moisture permeability of 300 g/m²/day or less, and the amount of change in luminous transmittance thereof is reduced as compared to Example 3.

In Table 1, in the anti-reflective film-attached transparent substrates in Examples 1 and 2 in which the silicon oxide layer has a surface roughness (arithmetic mean height (Sa)) of 1.00 nm or less in a measurement range of 1 μm×1 μm, the silicon oxide layer is dense and the moisture infiltration from the outside can be prevented, so that the amount of change in luminous transmittance is reduced as compared with Example 3.

Although various embodiments have been described above with reference to the drawings, it is needless to say that the present invention is not limited to such an example. It is apparent to those skilled in the art that various changes and modifications can be conceived within the scope of the claims, and it is also understood that such variations and modifications belong to the technical scope of the present invention. Constituent elements in the embodiments described above may be combined freely within a range not departing from the spirit of the present invention.

The present application is based on a Japanese patent application (No. 2020-115919) filed on Jul. 3, 2020, contents of which are incorporated herein by reference.

REFERENCE SIGNS LIST

10 transparent substrate
30 multilayer film
32, 34 dielectric layer

The invention claimed is:

1. An anti-reflective film-attached transparent substrate comprising a transparent substrate having two main surfaces and, on at least one of the main surfaces, a multilayer film in which at least two layers having different refractive indices are laminated,
  wherein at least one silicon oxide layer among the layers in the multilayer film has a moisture permeability of 300 g/m²/day or less;
  at least one layer among the layers in the multilayer film is mainly formed of an Si oxide,
  at least another layer among the layers in the multilayer film is mainly formed of a mixed oxide of an oxide comprising at least one element selected from the group A consisting of Mo and W and an oxide comprising at least one element selected from the group B consisting of Si, Nb, Ti, Zr, Ta, Al, Sn, and In,
  a content of the elements of the group B contained in the mixed oxide is less than 80 mass % with respect to a total of the elements of the group A contained in the mixed oxide and the elements of the group B contained in the mixed oxide, and
  an outermost layer of the multilayer film is $SiO_x$, wherein x is less than 2.

2. The anti-reflective film-attached transparent substrate according to claim 1, wherein the at least one silicon oxide layer among the layers in the multilayer film has an arithmetic mean height (Sa) of 1.00 nm or less, which represents a surface roughness in a measurement range of 1 μm×1 μm.

3. The anti-reflective film-attached transparent substrate according to claim 1, wherein the at least one silicon oxide layer among the layers in the multilayer film has an arithmetic mean height (Sa) of 0.90 nm or less, which represents a surface roughness in a measurement range of 5 μm×5 μm.

4. The anti-reflective film-attached transparent substrate according to claim 1, wherein the at least one silicon oxide layer among the layers in the multilayer film has a hardness of 5.0 GPa or more.

5. The anti-reflective film-attached transparent substrate according to claim 1, wherein the at least one silicon oxide layer among the layers in the multilayer film has an elastic modulus of 70 GPa or more.

6. The anti-reflective film-attached transparent substrate according to claim 1, further comprising an anti-fouling film on the multilayer film.

7. The anti-reflective film-attached transparent substrate according to claim 1, wherein the transparent substrate is a glass substrate.

8. The anti-reflective film-attached transparent substrate according to claim 1, wherein the transparent substrate is a resin substrate.

9. The anti-reflective film-attached transparent substrate according to claim 1, wherein the transparent substrate is a laminate formed of a glass and a resin substrate.

10. The anti-reflective film-attached transparent substrate according to claim 7, wherein the glass is chemically strengthened.

11. The anti-reflective film-attached transparent substrate according to claim 1, wherein the transparent substrate is subjected to an anti-glare treatment on the main surface on a side where multi-layer film is provided.

12. An image display device comprising the anti-reflective film-attached transparent substrate according to claim 1.

13. The anti-reflective film-attached transparent substrate according to claim 1, wherein all layers of the multilayer film are oxygen-deficient layers.

14. An anti-reflective film-attached transparent substrate comprising:

a transparent substrate having two main surfaces and, on at least one of the main surfaces, a multilayer film in which at least two layers having different refractive indices are laminated, wherein at least one silicon oxide layer among the layers in the multilayer film has a moisture permeability of 300 g/m²/day or less, the at least one silicon oxide layer among the layers in the multilayer film has an elastic modulus of 70 GPa or more, and an outermost layer of the multilayer film is $SiO_x$, wherein x is less than 2.

15. The anti-reflective film-attached transparent substrate according to claim 14, wherein the at least one silicon oxide layer among the layers in the multilayer film has an arithmetic mean height (Sa) of 1.00 nm or less, which represents a surface roughness in a measurement range of 1 μm×1 μm.

16. The anti-reflective film-attached transparent substrate according to claim 14, wherein the at least one silicon oxide layer among the layers in the multilayer film has an arithmetic mean height (Sa) of 0.90 nm or less, which represents a surface roughness in a measurement range of 5 μm×5 μm.

17. The anti-reflective film-attached transparent substrate according to claim 14, wherein the at least one silicon oxide layer among the layers in the multilayer film has a hardness of 5.0 GPa or more.

18. The anti-reflective film-attached transparent substrate according to claim 14, further comprising an anti-fouling film on the multilayer film.

19. The anti-reflective film-attached transparent substrate according to claim 14, wherein the transparent substrate is a glass substrate.

20. The anti-reflective film-attached transparent substrate according to claim 14, wherein the transparent substrate is a resin substrate.

21. The anti-reflective film-attached transparent substrate according to claim 14, wherein the transparent substrate is a laminate formed of a glass and a resin substrate.

22. The anti-reflective film-attached transparent substrate according to claim 19, wherein the glass is chemically strengthened.

23. The anti-reflective film-attached transparent substrate according to claim 14, wherein the transparent substrate is subjected to an anti-glare treatment on the main surface on a side where the multilayer film is provided.

24. An image display device comprising the anti-reflective film-attached transparent substrate according to claim 14.

25. The anti-reflective film-attached transparent substrate according to claim 14, wherein all layers of the multilayer film are oxygen-deficient layers.

* * * * *